United States Patent
Cao et al.

(10) Patent No.: US 10,880,172 B2
(45) Date of Patent: Dec. 29, 2020

(54) OPTIMIZATION OF CLOUD COMPLIANCE SERVICES BASED ON COMPLIANCE ACTIONS

(71) Applicant: INTERNATIONAL BUSINESS MACHINES CORPORATION, Armonk, NY (US)

(72) Inventors: Bin Cao, Stanford, CA (US); David M. Egle, Rochester, MN (US); Daniel L. Hiebert, Pine Island, MN (US); Yongwen Wu, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1197 days.

(21) Appl. No.: 14/938,976

(22) Filed: Nov. 12, 2015

(65) Prior Publication Data

US 2017/0141961 A1    May 18, 2017

(51) Int. Cl.
*H04L 12/24* (2006.01)
*H04L 12/26* (2006.01)
*G06Q 30/02* (2012.01)

(52) U.S. Cl.
CPC ..... *H04L 41/0869* (2013.01); *G06Q 30/0277* (2013.01); *H04L 43/50* (2013.01)

(58) Field of Classification Search
CPC ..... H04L 63/10; H04L 63/20; H04L 63/0227; H04L 67/34; H04L 47/70; H04L 47/10; H04L 65/4092; H04L 67/02; H04L 1/0002; H04L 5/0046; H04L 69/22; H04L 67/10; H04L 63/105; H04L 67/306; H04L 41/12; H04L 43/50; G06F 21/00; G06F 21/577;

(Continued)

(56) References Cited

U.S. PATENT DOCUMENTS 8,032,557 B1*  10/2011  Vijendra ............... G06Q 10/06
                                                       707/783
8,665,872 B2*  3/2014   Komatsu ............... H04L 12/42
                                                       370/392

(Continued)

OTHER PUBLICATIONS

VMware; Gain visibility into your VMware environment; Dec. 24, 2014; 4 pages (Year: 2014).*

(Continued)

*Primary Examiner* — Backhean Tiv
*Assistant Examiner* — Linh T. Nguyen
(74) *Attorney, Agent, or Firm* — William Hartwell; Andrew M. Calderon; Roberst Calderon Safran & Cole, P.C.

(57) ABSTRACT

A computer-implemented method includes receiving, by a computing device via an application programming interface (API) or user interface, compliance definitions identifying compliance checks for endpoints in a cloud network; generating, by the computing device, a compliance check inventory identifying the compliance checks and actions associated with the compliance checks; storing, by the computing device, the compliance check inventory in a computer storage system identifying, by the computing device, redundant actions in the compliance check inventory; identifying, by the computing device, outdated actions in the compliance check inventory; and updating, by the computing device, the compliance check inventory by eliminating the redundant actions and the outdated actions.

20 Claims, 6 Drawing Sheets

(58) Field of Classification Search
CPC .. G06F 9/45558; G06F 21/60; G06F 11/0709;
G06F 11/079; G06F 11/3055; G06F
11/327; G06F 11/328; G06F 11/3409;
G06F 11/3672
USPC ...... 709/224, 225, 231, 203, 219; 726/1, 26,
726/22, 25; 705/7.12; 707/694
See application file for complete search history.

(56) References Cited

U.S. PATENT DOCUMENTS

| | | | | |
|---|---|---|---|---|
| 9,854,002 | B1* | 12/2017 | Streete | H04L 63/10 |
| 2004/0102990 | A1* | 5/2004 | Jones | G06Q 10/063 |
| | | | | 705/7.26 |
| 2007/0016544 | A1* | 1/2007 | Graefe | G06F 16/28 |
| 2008/0059474 | A1* | 3/2008 | Lim | G06F 21/604 |
| 2008/0134178 | A1* | 6/2008 | Fitzgerald | G06F 9/45537 |
| | | | | 718/1 |
| 2010/0058114 | A1 | 3/2010 | Perkins et al. | |
| 2012/0102543 | A1* | 4/2012 | Kohli | H04L 63/20 |
| | | | | 726/1 |
| 2013/0204657 | A1* | 8/2013 | Ghosh | G06Q 30/02 |
| | | | | 705/7.29 |
| 2013/0238157 | A1* | 9/2013 | Luke | H02J 13/0006 |
| | | | | 700/295 |
| 2013/0246853 | A1* | 9/2013 | Salame | G06F 11/079 |
| | | | | 714/37 |
| 2013/0278492 | A1* | 10/2013 | Stolarz | G06F 3/14 |
| | | | | 345/156 |
| 2014/0331277 | A1* | 11/2014 | Frascadore | H04L 29/06 |
| 2014/0359692 | A1* | 12/2014 | Chari | H04L 63/20 |
| | | | | 726/1 |
| 2015/0082016 | A1* | 3/2015 | Bonczkowski | G06F 9/44505 |
| | | | | 713/100 |
| 2016/0019636 | A1* | 1/2016 | Adapalli | G06Q 30/0641 |
| | | | | 705/26.62 |
| 2016/0197962 | A1* | 7/2016 | Winn | H04L 63/20 |
| | | | | 713/168 |

OTHER PUBLICATIONS

Red Hat Inc.; Configuring Control Policies with CloudForms Management Engine; Jan. 8, 2015; 8 pages (Year: 2015).*
AWS Architecture and Security Recommendations for FedRAMP Compliance, Miller et al.; Dec. 2015; pp. 1-37 (Year: 2014).*
Infrastructure Qualification Proposed Standard; Morrison et al.; Apr. 4, 2013; IVT Network; pp. 1-27 (Year: 2013).*
Anonymous, "Method and System for Policy Based Security and Compliance Management for Cloud Environments", IP.com, Aug. 6, 2012, pp. 1-9.
Mell et al., "The NIST Definition of Cloud Computing", NIST, Special Publication 800-145, Sep. 2011, 7 pages.
Unknown, "What are Managed Services & How They Help Small Business", Networks Unlimited, http://networksunlimited.com/blog/2014/4/4/what-are-managed-services-how-they-help-small-business, Apr. 4, 2014, 9 pages.
Mombarg, "IBM Cloud Managed Services", http://www.ibm.com/cloud-computing/us/en/products/ibm-cloud-managed-services.html, Jun. 18, 2015, 2 pages.

* cited by examiner

OPTIMIZATION OF CLOUD COMPLIANCE SERVICES BASED ON COMPLIANCE ACTIONS

BACKGROUND

The present invention generally relates to cloud compliance checks, and more particularly, to optimization of cloud compliance checks based on compliance actions.

Cloud computing is computing in which large groups of remote servers are networked together for centralized data storage and online access to services or resources. In essence, cloud computing pools resources and controls their availability through virtualization technologies. Cloud computing architectures implement virtual machines (VMs) to create different virtual environments supporting different services.

Cloud managed services is the advanced management of the virtualized endpoints. Cloud managed services is becoming more prevalent in the public, private, and hybrid cloud markets as a way to ensure the virtualized workloads meet certain operating standards. Cloud managed services brings the idea of setting up services such as Anti-Virus, Backup, Disaster Recovery, Monitor, Health-Check, Patching, Security and other services to virtualized servers or VMs to ensure their stability, security, and performance. Cloud managed services focuses on maintaining the operations of VMs implemented by a cloud computing network.

Cloud managed services also includes the implementation of compliance services, or software services that administers 'compliance checks' on VMs to ensure that the VMs adhere to a set of policies and reliability/performance standards. Certain tools built to specific criteria have been brought forward from the "private data" center as part of compliance checks. These tools are manual and labor intensive and lack basic automation. An example of such a tool is one that requires manual intervention on deploy, or a tool that runs only at deploy time/destroy time and does not get updated at regular intervals.

Problems occur when applying cloud managed services generically to larger numbers of virtualized servers. Some clouds may have as many as tens of thousands of VM's running across several sites, with perhaps thousands of VM's per site, and each managed service is working in isolation achieving the necessary goals to ensure the correct policies are adhered to across the cloud, (i.e., compliance). When compliance checks are run, they can be time consuming, network intensive and resource constraining.

SUMMARY

In an aspect of the invention, a computer-implemented method includes: receiving, by a computing device via an application programming interface (API) or user interface, compliance definitions identifying compliance checks for endpoints in a cloud network; generating, by the computing device, a compliance check inventory identifying the compliance checks and actions associated with the compliance checks; storing, by the computing device, the compliance check inventory in a computer storage system; identifying, by the computing device, redundant actions in the compliance check inventory; identifying, by the computing device, outdated actions in the compliance check inventory; and updating, by the computing device, the compliance check inventory by eliminating the redundant actions and the outdated actions.

In another aspect of the invention, there is a computer program product for optimizing a compliance check inventory. The computer program product includes a computer readable storage medium having program instructions embodied therewith. The program instructions are executable by a computing device to cause the computing device to: monitor compliance checks performed on endpoints of a cloud network by performing compliance checks with the endpoints; monitor cloud configuration information of the cloud network to perform compliance checks with the endpoints and requesting the cloud configuration information as part of performing the compliance checks; and periodically or intermittently update a compliance check inventory based on monitoring the compliance checks and the cloud configuration information. The compliance check inventory identifies the compliance checks performed on the endpoints.

In another aspect of the invention, a system includes: a CPU, a computer readable memory and a computer readable storage medium associated with a computing device; program instructions to receive compliance definitions identifying compliance checks for endpoints in a cloud network; program instructions to generate a compliance check inventory storing information identifying the compliance checks and actions associated with the compliance checks; program instructions to perform the compliance checks with the endpoints based on the compliance checks stored in the compliance check inventory; program instructions to receive results from performing the compliance checks; program instructions to identify redundant actions in the compliance check inventory based on receiving the results; program instructions to identify outdated actions in the compliance check inventory based on receiving the results, where the outdated actions include checks to components no longer implemented by the endpoints; and program instructions to update the compliance check inventory by eliminating the redundant actions and the outdated actions. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
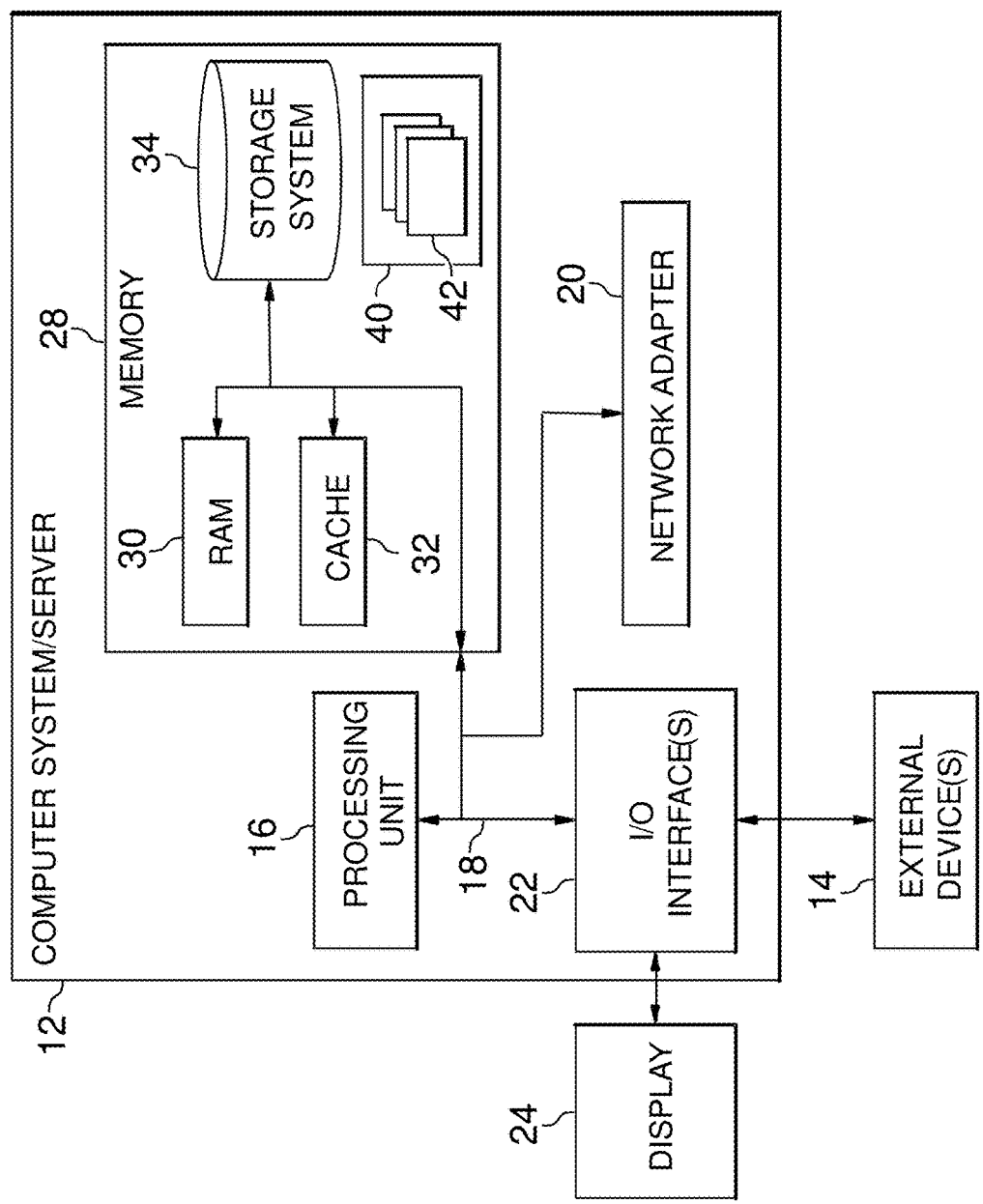
FIG. 1 depicts a cloud computing node according to an embodiment of the present invention.

The present invention generally relates to cloud compliance checks, and more particularly, to optimization of cloud compliance checks based on compliance actions. In embodiments, the number of compliance checks run in a cloud environment may be substantially reduced without sacrificing operating performance or reliability of cloud computing endpoints (e.g., virtual machines). Advantageously, computing resources used to perform compliance checks are conserved. Further, network traffic is reduced when performing compliance checks. Additionally, faster compliance verification and response time to mitigate non-compliant endpoints is achieved as a result of the minimal number of compliance checks performed.

In embodiments of the invention, an inventory is maintained identifying a culmination of compliance checks run within a cloud environment. Over time, this inventory is refined by using a comparing algorithm to determine and eliminate those compliance checks that are redundant, are outdated and no longer necessary, and/or do not impact or provide value to the cloud environment.

As described herein, each compliance check includes one or more actions (e.g., compliance check #1 checks Package Models 1, 2, 3, and 4). The inventory identifies the culmination of culmination checks as well as their actions. The comparing algorithm may identify compliance checks having redundant actions. These compliance checks can be redefined so as to remove redundant actions. Alternatively, a compliance check can be eliminated altogether (e.g., if all actions for the compliance check are redundant). As an illustrative example, assume that compliance check #1 checks Package Model A, compliance check #2 checks Package Model B, and compliance check #3 checks Package Model A and B. Given these assumptions, a determination may be made that compliance checks #1 and #2 can be eliminated from the inventory.

In embodiments, compliance checks having actions that are no longer necessary or are outdated may be redefined so as to remove unnecessary actions, or eliminated (e.g., when all actions compliance check includes outdated/unnecessary actions). As an illustrative example, assume that compliance check #1 checks Package Model A, but Package Model A is no longer installed. Given this assumption, the inventory may be updated to eliminate compliance check #1.

In embodiments, actions can be assigned priorities based on their impact to cloud endpoints. For example, if a particular action identifies potential alerts and/or errors in a threshold number of VMs, that particular action may be assigned a relatively high priority. In embodiments, compliance checks may be eliminated in the inventory in a manner such that at least single instances of high priority actions are present. Also, higher priority compliance checks may be performed ahead of lower priority compliance checks so that issues found from higher priority compliance checks are resolved first. In embodiments, priorities to the compliance checks may be based on predicted user actions or trends. For example, based on information indicating that a user is more likely to use component A prior to using component B at a particular time, the compliance server 210 may adjust the priority of the compliance checks such that component A is checked prior to component B. Further, a measure of resources to utilize when performing particular checks may be determined (e.g., based on a measure of priority or importance).

In embodiments, the inventory can be maintained based on updated compliance check requirements, definitions, and configurations (e.g., updates to software, package models, and services running on VMs). For example, when a particular package model is uninstalled, the inventory is updated to remove actions that check the uninstalled package model. When a new package model is installed, the inventory can be updated to include compliance checks for the newly installed package model. Advantageously, the number of compliance checks is reduced without adversely affecting the reliability and performance of cloud endpoints in a cloud network. As such, computing resources are conserved when performing compliance checks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
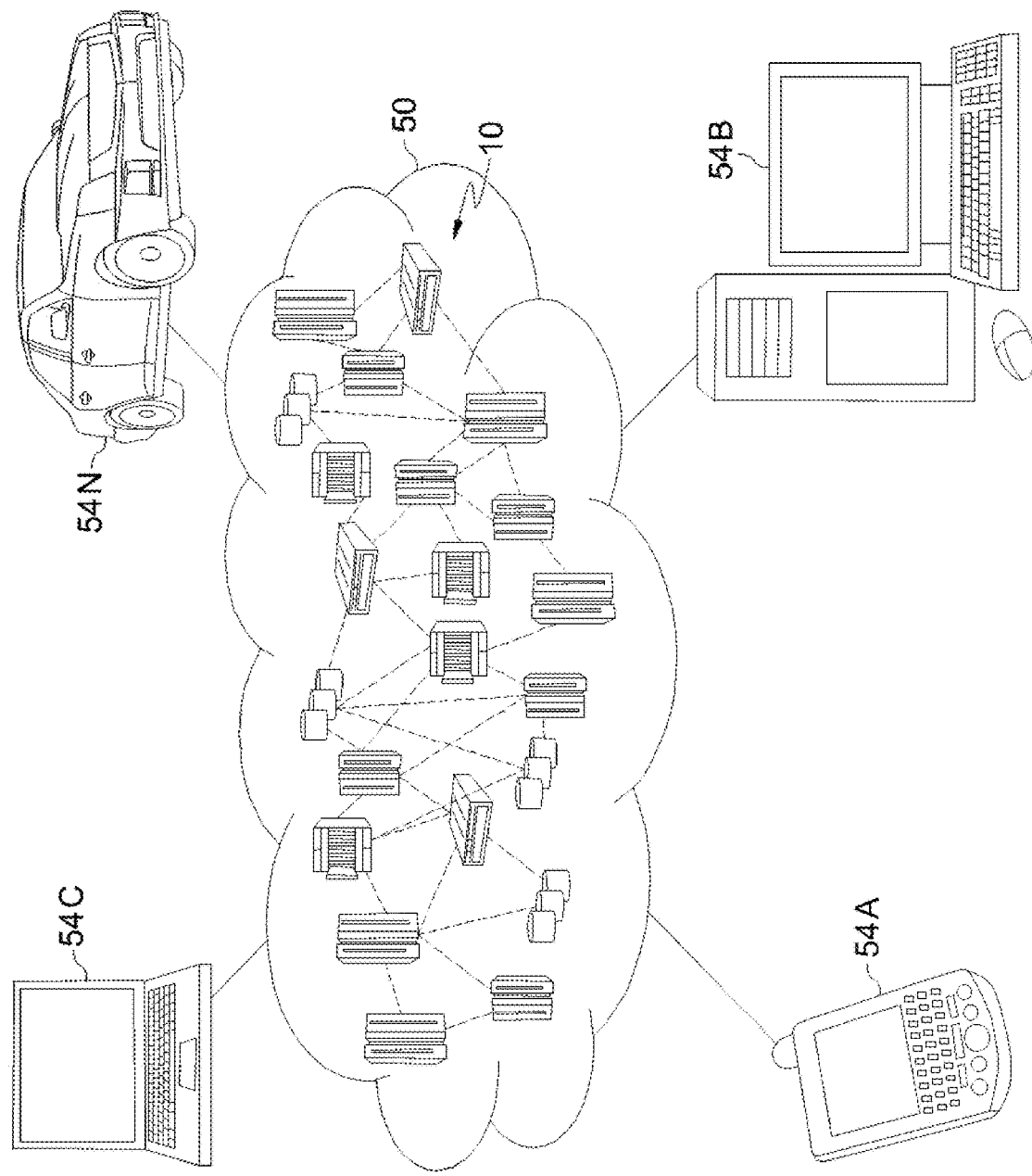
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
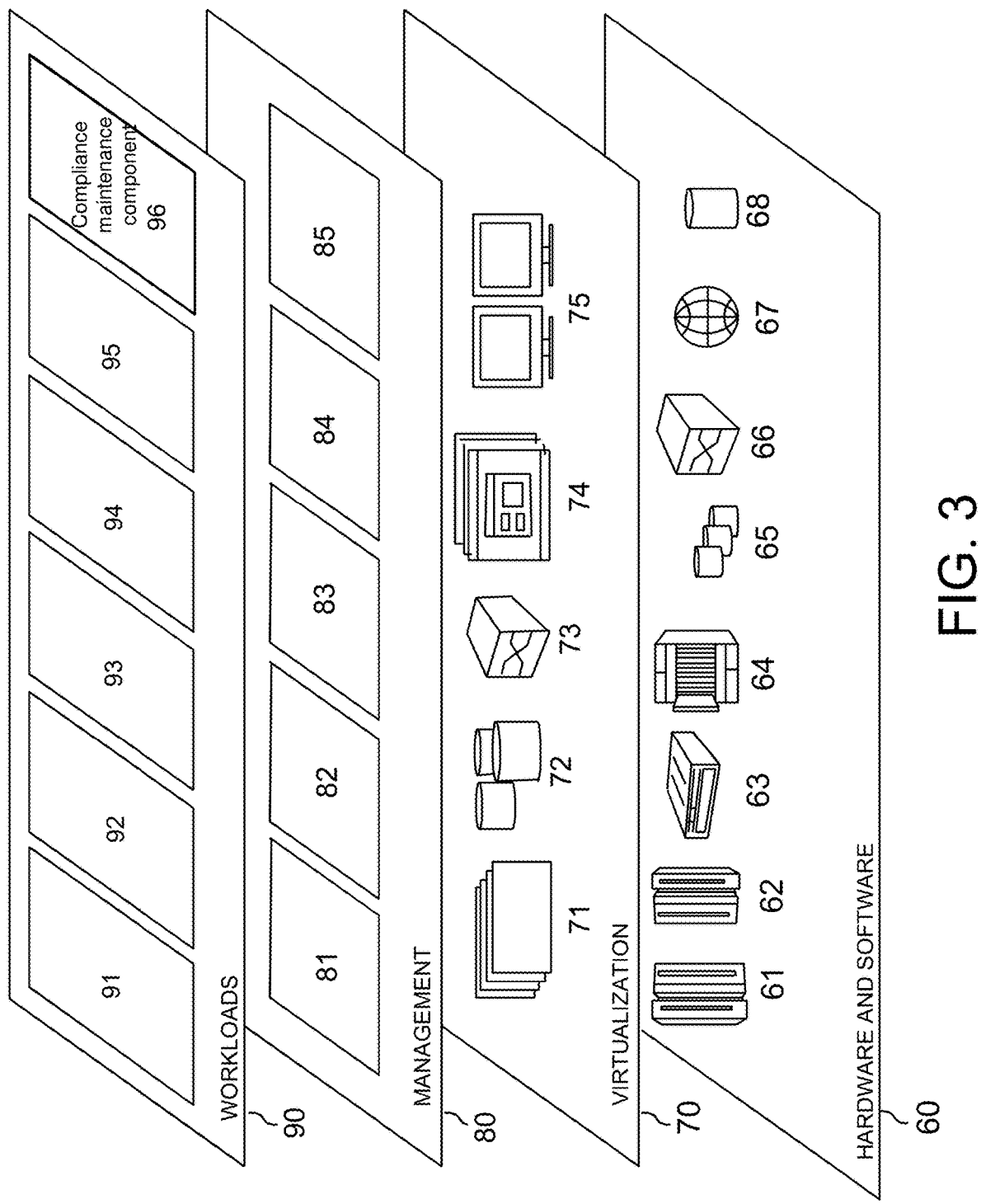
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and compliance maintenance component 96.

Referring back to FIG. 1, the Program/utility 40 may include one or more program modules 42 that generally carry out the functions and/or methodologies of embodiments of the invention as described herein. Specifically, the program modules 42 may receive compliance definitions and cloud configuration information perform compliance checks, and update/maintain a compliance check inventory based on the results of the compliance checks and/or updates to compliance definitions and clod configuration information. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking selection server as shown in FIG. 4.

Figure 4:
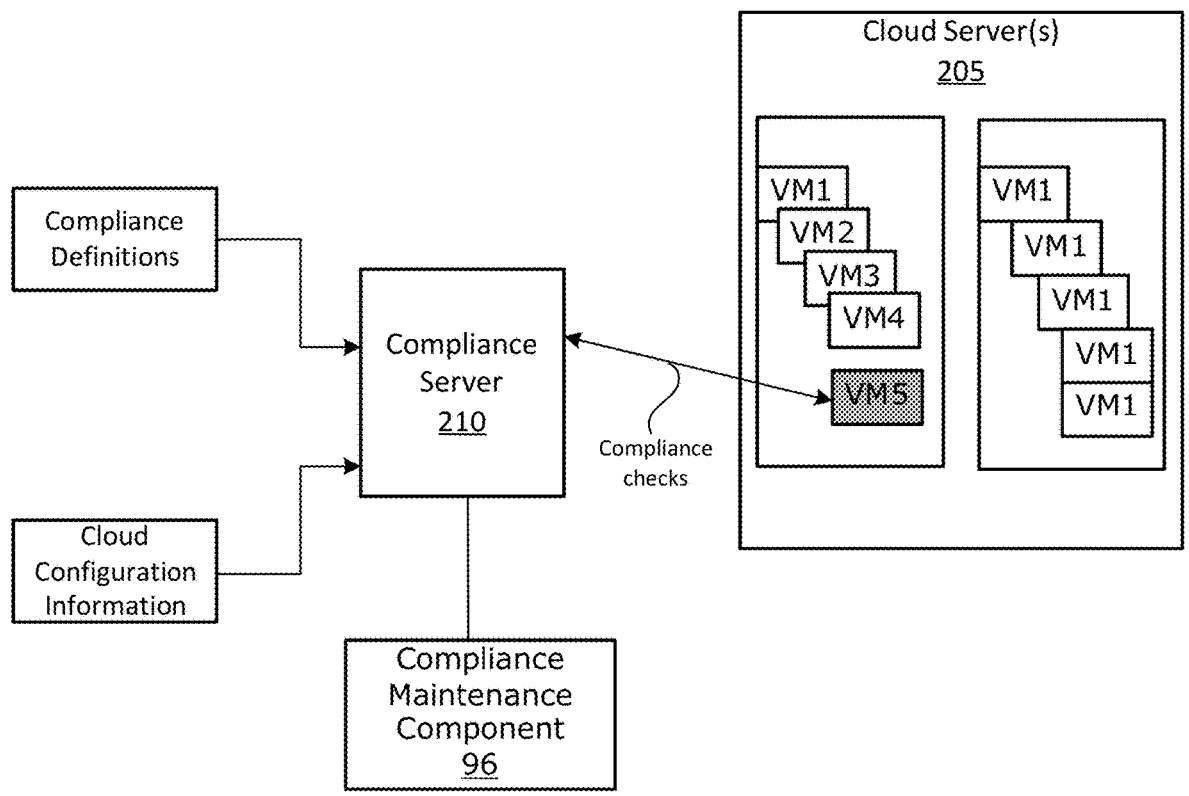
FIG. 4 shows an overview of an example implementation in accordance with aspects of the present invention.

FIG. 4 shows an overview of an example implementation in accordance with aspects of the present invention. As shown in FIG. 4, cloud server(s) 205 implement multiple different virtual machines over different regions (e.g., network regions or geographical regions). A compliance server 210 performs compliance checks on different endpoints (e.g., VMs) implemented by the cloud server(s) 205. The compliance server 210 includes the compliance maintenance component 96 of FIG. 3, which may be implemented as a program module 42, and which may generate and maintain an inventory of the culmination of compliance checks performed on the cloud server(s) 205 as described herein.

The cloud server 210 may receive compliance definitions and cloud configuration information. The compliance definitions identify compliance checks, the actions for each compliance check, and the endpoints (e.g., VMs) for which to perform the checks. The cloud configuration information identifies the topology and/or architecture of a cloud network implemented by the cloud server(s) 205. For example, the cloud configuration information identifies the VMs, the functions of the VMs, services provided by the VMs, software implemented by the VMs, etc. As described in greater detail below, the cloud configuration information may be used to identify actions that are no longer needed (e.g., actions that check software or program models that are no longer installed on a VM).

As shown in FIG. 4, the compliance server 210 may perform compliance checks with the cloud server(s) 205. In an illustrative example of FIG. 4, the compliance server 210 performs compliance checks with VMS. For example, the compliance server 210 may perform the compliance checks identified in the compliance definitions. The compliance server 210 may receive results to the compliance checks, such as alerts identifying that certain checks have identified potential problems with the VM. Also, the compliance server 210 may identify the configuration of the VM when performing the compliance check (e.g., program models and/or software implemented by the VM).

As described above, the compliance maintenance component 96 generates the inventory based on the compliance definitions. Further, the compliance maintenance component 96 may maintain the inventory of compliance checks by receiving changes to the compliance definitions and the cloud configuration information (e.g., from external sources, such as cloud management and engineering administrators). Also, the compliance maintenance component 96 may maintain the inventory by monitoring the cloud configuration information when performing compliance checks. Further, the compliance maintenance component 96 may maintain the inventory based on the results of the compliance checks (e.g., by prioritizing actions that have triggered a threshold number of alerts to ensure that these actions are not removed from the inventory). For example, the compliance maintenance component 96 may analyze the compliance definitions and identify compliance checks having redundant actions. These compliance checks can be redefined so as to remove redundant actions. Alternatively, a compliance check can be eliminated altogether (e.g., if all actions for the compliance check are redundant). The compliance maintenance component 96 may check for redundant actions each time updates to compliance definitions are received.

As another example, the compliance maintenance component 96 may redefine or eliminate compliance checks having outdated/unnecessary actions (e.g., based on the cloud configuration information identifying package models/software that are no long installed on the VM). The compliance maintenance component 96 may check for outdated/unnecessary actions each time updates to the cloud configuration information is received (e.g., from external sources) and/or each time updated cloud configuration information is identified from performing compliance checks. Also, the compliance maintenance component 96 may eliminate actions based on receiving alerts from endpoints identifying actions that check outdated software/program models.

As another example, the compliance maintenance component 96 may prevent actions from being eliminated when a measure of importance exceeds a threshold. For example, the measure of importance may be based on the number of alerts triggered by an action, or a measure of importance of a package model checked by the action. Advantageously, the number of compliance checks is reduced without adversely affecting the reliability and performance of cloud endpoints in a cloud network. As such, computing resources are conserved when performing compliance checks.

Figure 5:
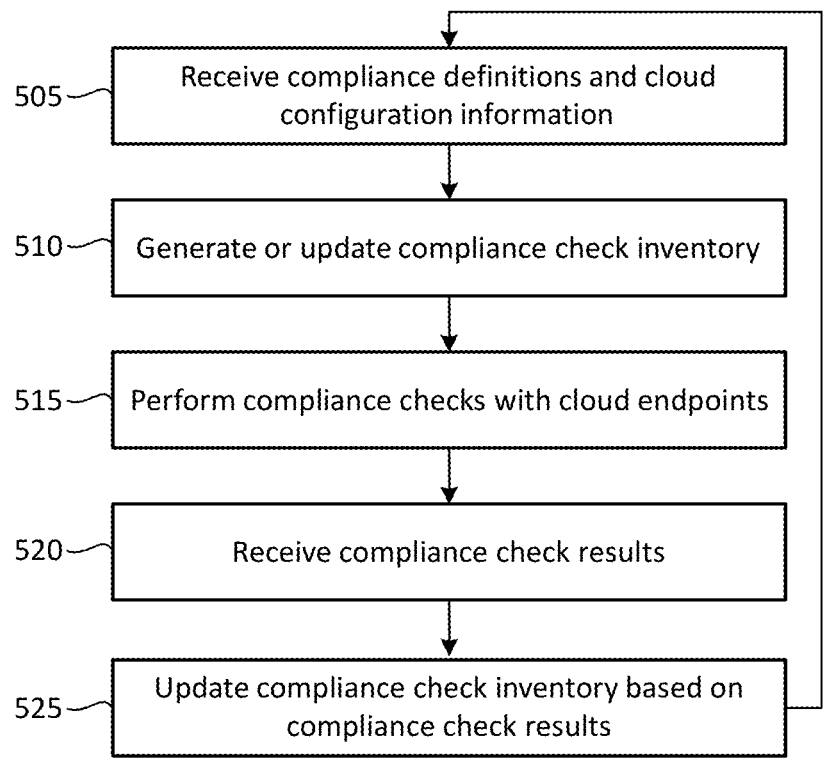
FIG. 5 shows an example flowchart for updating a compliance check inventory in accordance with aspects of the present invention.

FIG. 5 shows an example flowchart for updating a compliance check inventory in accordance with aspects of the present invention. The steps of FIG. 5 may be implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention.

At step 505, compliance definitions and cloud configuration information is received. For example, the compliance server 210 may receive the compliance definitions and the cloud configuration information (e.g., using an application program interface (API) and/or a user interface). In embodiments, the compliance server 210 may receive the compliance definition and the cloud configuration information from external sources, such as cloud management and engineering administrators) for a cloud network. As described above, the compliance definitions identify compliance checks, the actions for each compliance check, and the endpoints (e.g., VMs) for which to perform the checks. The cloud configuration information identifies the topology and/or architecture of a cloud network.

At step 510, a compliance check inventory is generated or updated. For example, if a compliance check inventory does not currently exist, the compliance server 210 may generate the compliance check inventory by storing information identifying the compliance checks from the compliance definitions (e.g., the culmination of compliance checks and their actions for a cloud network). The compliance server 210 may also store the newly generated compliance check inventory in a computer storage system associated with the compliance server 210. Further, the compliance server 210 may compare the compliance definitions to the cloud configuration information to determine whether outdated actions are included in the compliance definitions. The compliance server 210 may then update the compliance check inventory to remove any outdated actions (e.g., by redefining compliance checks to remove outdated actions, or eliminating compliance checks having only outdated actions). The compliance server 210 may further identify redundant actions included in the compliance check inventory, and eliminate those actions from the inventory (e.g., by redefining compliance checks to remove redundant actions, or eliminating compliance checks having only redundant actions). When updating the compliance check inventory, the compliance server 210 may not remove actions that have been tagged as "required" or "high priority." For example, the compliance server 210 may maintain at least one instance of a required action within the culmination of compliance checks, and may even retain redundant instances of required actions if these actions are deemed to be of relatively high importance in which redundant actions are desired. In embodiments, the compliance check inventory may identify higher priority or higher weighted compliance checks and actions.

At step 515, compliance checks with cloud endpoints (e.g., VMs and/or other endpoints of a cloud network) are performed. For example, the compliance server 210 may perform compliance checks with cloud endpoints. The compliance server 210 may perform the compliance checks included in the compliance check inventory.

At step 520, compliance check results are received. For example, the compliance server 210 may receive the compliance check results. In embodiments, the compliance check results may include messages indicating the whether VMs in the cloud network adhere or comply with a set of policies and/or performance standards. In embodiments, the messages may identify a VM, and the result of each compliance check performed on the VM. Further, the messages may identify package modules, software, and/or other items checked as part of the compliance check. In this way, the compliance server 210 may monitor the package modules, software, and/or other items checked by analyzing the results of compliance checks. As described in greater detail below, the compliance server 210 may update the compliance check inventory to eliminate redundant actions identified when analyzing the results of compliance checks.

In embodiments, the compliance check results may include alerts identifying that certain checks have identified potential problems with the VM. As described in greater detail below, compliance checks and actions that trigger a threshold number of alerts identifying potential problems may increase the priority of those compliance checks. Also, the compliance check results may include update cloud configuration information, and/or alerts identifying actions that attempt to check package models and/or software that is no longer installed on a VM. In this way, the compliance server 210 may monitor the cloud configuration by performing compliance checks. For example, the compliance checks may include a default request to each VM (or a managing component) to provide updated cloud configuration information. As described in greater detail below, the compliance server 210 may update the compliance check inventory to eliminate outdated actions identified when monitoring the cloud configuration information.

At step 525, the compliance check inventory is updated based on the compliance check results. For example, the compliance server 210 may identify outdated actions based on the updated cloud configuration information. For example, the compliance server 210 may identify actions that attempted to check package models, software, and/or other items that are no longer installed. In embodiments, the compliance server 210 may identify redundant actions based on the compliance check results. For example, the compliance server 210 may analyze the compliance check results to identify when multiple actions checked the same package model, software, or other component (e.g., based on messages in the compliance check results identifying the package models/software checked). Further, the compliance server 210 may identify "high priority" actions based on a number of alerts triggered by the action and/or a measure of importance associated with components (e.g., software/package models) checked by the action. The compliance server 210 may not eliminate "high" priority actions, and may retain redundant "high" priority actions.

When updating the compliance check inventory, the compliance server 210 may assign priorities to the compliance checks based on the number of alerts triggered by the action, a number of dependent components, and/or a measure of importance associated with components (e.g., software/package models) checked by the action. When performing subsequent compliance checks, higher priority compliance checks may be performed ahead of lower priority compliance checks so that issues found from higher priority compliance checks are resolved first. Resolving issues higher priority compliance checks would reduce the number of actions to resolve issues from dependent components. In embodiments, the compliance server 210 may assign priorities to the compliance checks based on predicted user actions or trends. For example, based on information indicating that a user is more likely to use component A prior to using component B at a particular time, the compliance server 210 may adjust the priority of the compliance checks such that component A is checked prior to component B. Further, the compliance server 210 may store information in the compliance check inventory identifying a measure of resources to utilize when performing particular checks (e.g., based on a measure of priority or importance).

The process of FIG. 5 may repeat as updated compliance definitions and/or configuration information is received, e.g., from external sources. In embodiments, the compliance server 210 may periodically or intermittently request updated compliance definitions and/or configuration management information (e.g., at intervals defined by an administrator or by compliance services). As a result, the compliance check inventory is continuously maintained to remove redundant and outdated actions over time without removing high priority or required actions. Further, the compliance check inventory includes an up-to-date list if compliance checks to run on particular endpoints in a cloud network.

Figure 6:
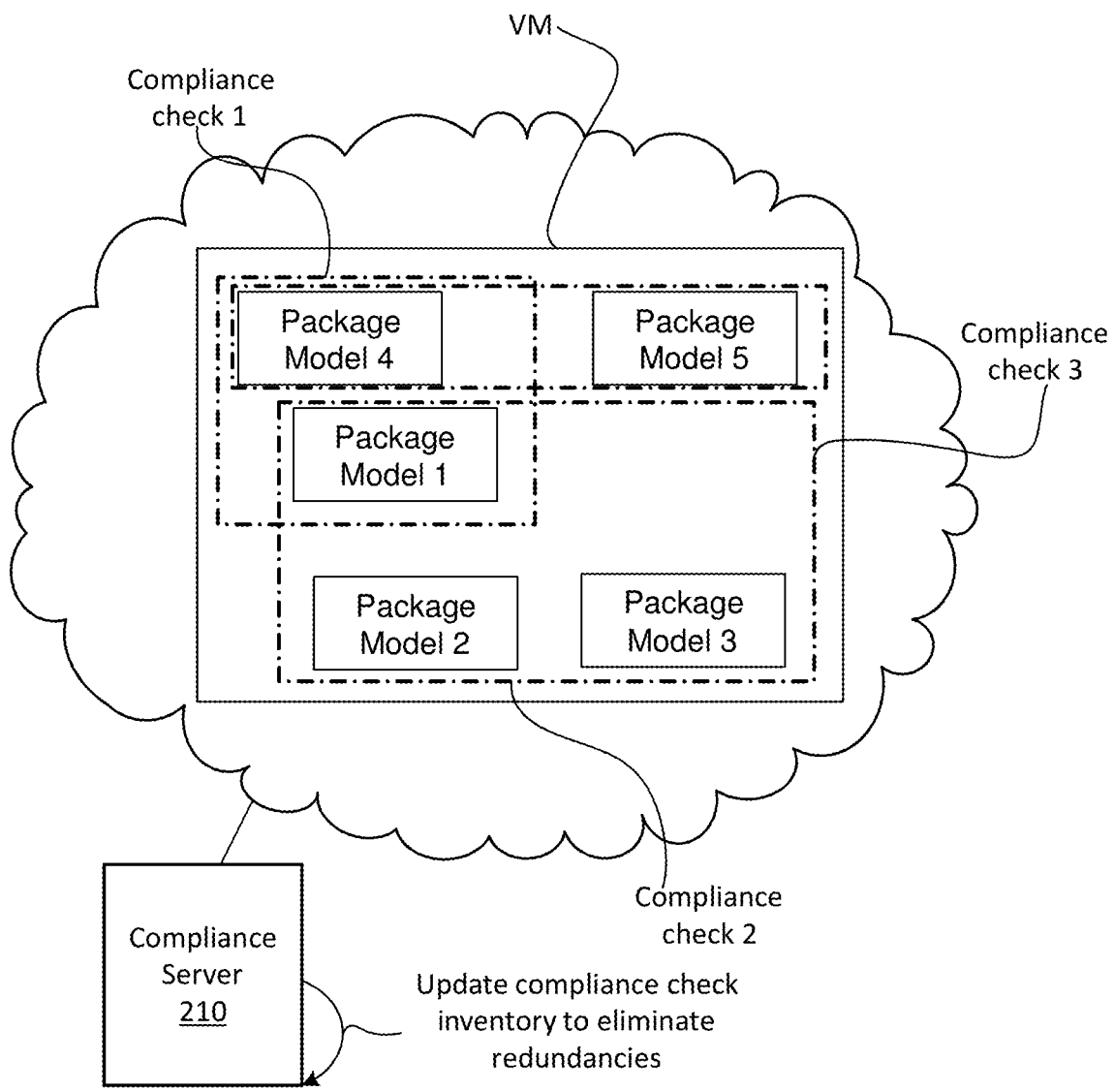
FIG. 6 shows an example implementation for updating a compliance check inventory to eliminate redundancies in accordance with aspects of the present invention.

FIG. 6 shows an example implementation for updating a compliance check inventory to eliminate redundancies in accordance with aspects of the present invention. As shown in FIG. 6, a VM in a cloud environment may implement package models 1, 2, 3, 4, and 5. Further, FIG. 6 shows compliance checks that are run on the VM based on compliance definitions. For example, FIG. 6 shows compliance checks 1, 2, and 3, and the actions of the compliance checks. Further, compliance check 1 checks package models 1 and 4, compliance check 2 checks package models 1, 2, and 3, and compliance check 3 checks package models, 4, and 5. The compliance server 210 may analyze the compliance definitions and determine that compliance check 1 can be eliminated since compliance checks 2 and 3 already check the same package models as compliance check 1. The compliance server 210 may then update the compliance check inventory to remove the redundancies.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method for optimizing cloud compliance services based on compliance actions, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device via an application programming interface (API) or user interface, compliance definitions identifying compliance checks for endpoints in a cloud network;
generating, by the computing device, a compliance check inventory which does not currently exist by storing information identifying the compliance checks from the compliance definitions, the compliance check inventory identifying the compliance checks and actions associated with the compliance checks;
storing, by the computing device, the compliance check inventory in a computer storage system;
identifying, by the computing device, redundant actions in the compliance check inventory which are determined to not impact or provide value to the cloud network;
identifying, by the computing device, outdated actions in the compliance check inventory which are determined to not impact or provide value to the cloud network;
checking, by the computing device, the compliance check inventory for the redundant actions or the outdated actions each time updated cloud configuration information is identified from performing the compliance checks after the compliance checks have been performed;

maintaining, by the computing device, the compliance check inventory by maintaining higher priority actions compared to lower priority actions to ensure that the higher priority actions, including the redundant actions with a higher priority, are not removed from the compliance check inventory;

updating, by the computing device, the compliance check inventory by eliminating the redundant actions with a lower priority and the outdated actions; and prioritizing, by the computing device, the compliance checks based on predicted user actions so that an endpoint with the higher priority actions is checked prior to another endpoint with the lower priority actions.

2. The method of claim 1, further comprising:
performing compliance checks with the endpoints based on generating the compliance check inventory; and
receiving results to the compliance checks,
wherein identifying the redundant actions and the outdated actions is based on the results to the compliance checks.

3. The method of claim 2, wherein the results to the compliance checks include updated information identifying components implemented by the endpoints, wherein identifying the outdated actions is based on the updated information identifying components implemented by the endpoints.

4. The method of claim 1, further comprising receiving updates to the compliance definitions, wherein identifying the redundant actions and the outdated actions is based on receiving the updates to the compliance definitions.

5. The method of claim 1, further comprising receiving updates to configuration information identifying components implemented by the endpoints, wherein identifying the outdated actions is based on receiving the updates to the configuration information.

6. The method of claim 1, further comprising:
identifying actions having measures of importance that exceed a threshold; and
retain actions in compliance inventory that have measures of importance that exceed the threshold.

7. The method of claim 1, wherein the outdated actions include actions that check components that are no longer implemented by the endpoints.

8. The method of claim 7, further comprising using a comparing algorithm to determine and eliminate the redundant actions and the outdated actions, and actions no longer necessary which are determined to not impact or provide value to the cloud network, wherein the components include package models, software and other items that are no longer implemented by the endpoints to generate results listing outdated actions.

9. The method of claim 1, wherein updating the compliance check inventory reduces computing resources and network traffic when performing compliance checks on the endpoints after updating the compliance check inventory in relation to when compliance checks are performed prior to updating the compliance check inventory.

10. The method of claim 1, wherein a service provider at least one of creates, maintains, deploys and supports the computing device.

11. The method of claim 1, wherein steps of claim 1 are provided by a service provider on a subscription, advertising, and/or fee basis.

12. The method of claim 1, wherein the computing device includes software provided as a service in a cloud environment.

13. The method of claim 1, further comprising deploying a system for optimizing a compliance check inventory, comprising providing a computer infrastructure operable to perform the steps of claim 1.

14. A computer program product for optimizing a compliance check inventory, the computer program product comprising a computer readable storage medium having program instructions embodied therewith, the program instructions executable by a computing device to cause the computing device to:

prioritize compliance checks based on predicted user trends so that an endpoint of a cloud network with a higher priority is checked prior to another endpoint of the cloud network with a lower priority;

determine a measure of computing resources to be utilized when performing higher priority compliance checks;

monitor the compliance checks performed on endpoints of the cloud network by performing the compliance checks with the endpoints;

monitor cloud configuration information of the cloud network to perform compliance checks with the endpoints and requesting the cloud configuration information as part of performing the compliance checks;

identify actions which attempted to check package models, software, and other items that are no longer implemented by the endpoints to generate results listing outdated actions;

maintain a compliance check inventory which stores information identifying the compliance checks by prioritizing actions which have triggered a threshold number of alerts to ensure that the actions which have triggered the threshold number of alerts are not removed from the compliance check inventory; and periodically or intermittently update the compliance check inventory based on monitoring the compliance checks and the cloud configuration information to eliminate the outdated actions identified, wherein the compliance check inventory identifies the compliance checks performed on the endpoints.

15. The computer program product of claim 14, wherein when monitoring the compliance checks performed on the endpoints or when monitoring the cloud configuration information, the program instructions further cause the computing device to periodically or intermittently request updates to compliance definitions or updates to the cloud configuration information from an administrator of the cloud network.

16. The computer program product of claim 14 wherein the program instructions further cause the computing device to receive results to the compliance checks, wherein when monitoring the compliance checks performed on the endpoints or when monitoring the cloud configuration information, the program instructions further cause the computing device to monitoring the compliance checks performed on the endpoints or monitoring the cloud configuration information by receiving results to the compliance checks.

17. The computer program product of claim 14, wherein when periodically or intermittently updating the compliance check inventory, the program instructions further cause the computing device to updated the compliance check inventory by eliminating redundant or outdated actions.

18. The computer program product of claim 14, wherein updating the compliance check inventory comprises performing compliance checks on the endpoints after updating the compliance check inventory in relation to when compliance checks are performed prior to updating the compliance check inventory.

19. A system comprising:
a CPU, a computer readable memory and a computer readable storage medium associated with a computing device;
program instructions to receive compliance definitions identifying compliance checks for endpoints in a cloud network;
program instructions to generate a compliance check inventory which does not currently exist by storing information identifying the compliance checks from the compliance definitions, the compliance check inventory storing information identifying the compliance checks and actions associated with the compliance checks;
program instructions to prioritize the compliance checks within the compliance check inventory based on predicted user actions or trends so that an endpoint of a cloud network with a higher priority is checked prior to another endpoint of the cloud network with a lower priority;
program instructions to determine a measure of computing resources to be utilized when performing higher priority compliance checks;
program instructions to perform the compliance checks with the endpoints based on a priority of the compliance checks stored in the compliance check inventory;
program instructions to perform compliance checks by identifying actions which attempted to check package models, software, and other items that are no longer implemented by the endpoints to generate results listing outdated actions;
program instructions to receive the results from performing the compliance checks;
program instructions to identify redundant actions in the compliance check inventory based on receiving the results;
program instructions to check the compliance check inventory for the redundant actions or the outdated actions each time updated cloud configuration information is identified from performing the compliance checks;
program instructions to identify the outdated actions in the compliance check inventory based on receiving the results, wherein the outdated actions include checks to components no longer implemented by the endpoints;
program instructions to identify the actions by a priority based on a number of alerts triggered by an action and a measure of importance associated with the package models and the software checked by the action;
program instructions to maintain the compliance check inventory by maintaining actions with a higher priority compared to actions with a lower priority to ensure that the actions with the higher priority, including redundant actions with a higher priority, are not removed from the compliance check inventory; and
program instructions to update the compliance check inventory by eliminating the redundant actions with a lower priority and the outdated actions,
wherein the program instructions are stored on the computer readable storage medium for execution by the CPU via the computer readable memory.

20. The system of claim 19, wherein the program instructions to update the compliance check inventory includes program instructions to assign priorities to the compliance checks.

* * * * *